United States Patent
Sloan

[11] Patent Number: 5,928,324
[45] Date of Patent: Jul. 27, 1999

[54] DATA PROCESSING SYSTEM, AND METHOD HAVING A SERVER HANDLING OUTPUT REQUEST FROM A DISPLAY TERMINAL AND FORWARDING ACCESS REQUEST TO CLIENT SYSTEM

[75] Inventor: Keith Sloan, Itchen Abbas, United Kingdom

[73] Assignee: International Business Machines Corporation, Armonk, N.Y.

[21] Appl. No.: 08/915,299

[22] Filed: Aug. 20, 1997

[30] Foreign Application Priority Data

Apr. 2, 1997 [GB] United Kingdom .................. 9702260

[51] Int. Cl.[6] .................................................. G06F 15/16
[52] U.S. Cl. ........................ 709/203; 709/219; 709/217; 345/330
[58] Field of Search ........................ 395/200.33, 200.49, 395/651, 200.47; 345/329, 330, 331, 332

[56] References Cited

U.S. PATENT DOCUMENTS

| | | | |
|---|---|---|---|
| 5,347,632 | 9/1994 | Filepp et al. ........................ | 395/200.32 |
| 5,544,320 | 8/1996 | Konrad ................................ | 395/200.33 |
| 5,613,122 | 3/1997 | Bernard .................................... | 395/651 |
| 5,689,708 | 11/1997 | Regnier et al. ..................... | 395/200.59 |
| 5,848,246 | 7/1996 | Gish .................................... | 395/200.33 |

OTHER PUBLICATIONS

Nigel Hinds and A. W. England, An experimental mosaic interface to scientific information systems, Geoscience and Remote Sensing, 1994 Symposium, vol. 2, 00/94, IEEE/IEE Publication Ondisc.

*Primary Examiner*—Dung C. Dinh
*Assistant Examiner*—Chuong Ho
*Attorney, Agent, or Firm*—Gerald R. Woods

[57] ABSTRACT

A data processing system having a client system, a server system for connection to the client system, and a remote user terminal for connection to the server system. The client stores application code which is executed on receipt of a remote access request to generate output requests which are communicated to the server. The terminal issues the remote access request to the server. The output requests are display requests directed to manipulating the display screen, and non-display requests which can be processed independently of the terminal. The server forwards the remote access request to the client, stores decoding code, sends the decoding code to the terminal on detection of the remote access request, receives the output requests from the client, generates responses to the non-display requests on behalf of the terminal, returns the responses generated to the client and forwards the display requests to the terminal. The terminal receives the decoding code and the display requests from the server, and executes the decoding code to manipulate the display screen in dependence on the display requests.

9 Claims, 5 Drawing Sheets

DATA PROCESSING SYSTEM, AND METHOD HAVING A SERVER HANDLING OUTPUT REQUEST FROM A DISPLAY TERMINAL AND FORWARDING ACCESS REQUEST TO CLIENT SYSTEM

BACKGROUND OF THE INVENTION

1. Technical Field

The present invention relates to a data processing system, method, and server for supporting X and similar software protocols.

2. Description of the Prior Art

X is a software system having a device independent architecture for producing portable graphic user interfaces. X allows programs to display windows containing data on any hardware supporting the X protocol without relinking, recompiling, or otherwise modifying the application. The architecture of a conventional X system is based on a client-server arrangement in which client systems are connected to server systems via a network.

An X server typically comprises a personal computer work-station having input and output devices such as a graphics display screen, keyboard, and mouse. The X server process controls, via a device library, input and output devices of the personal computer. The X server process provides a portable layer between the display screen and an application.

A data processing system to which facilities are provided by an X server is conventionally referred to as an X client. An X client typically comprises an application, an X library, and a tool-kit interfacing the application to the X library. The tool-kit and the X library cooperate in providing the application with access to the facilities available from an X server via the network. In general, an X client communicates with an X server via the network using an asynchronous data protocol such as TCP/IP, DECnet, or Chaos. A single X client can connect to multiple X servers via the network. Equally, multiple X clients can connect via the network to a single X server concurrently. The distributed architecture of X allows servers and clients to operate on different machines anywhere in the network in addition to providing the aforementioned device independence.

In the context of X systems, the term display is generally taken to mean a single X server process, and the term screen is generally taken to mean a single hardware output device. A single display can support multiple screens. In general therefore, when referring to X systems, the terms display and server are interchangeable.

Conventional X systems are designed to handle a diverse range of X displays. Each X display in the range may for example support a different screen resolution, a different colour resolution, a different number of screens, different byte ordering, and different buffering. To maintain compatibility with the diverse range of X displays, conventional X systems are very generalised in nature. The generalised nature of a conventional X system necessitates flow of a relatively large volume of data between the associated X clients and X servers over the intervening network. Much of the data flow is not directly related to graphics display output. It will be appreciated therefore that X systems can be relatively slow in operation, particularly when they are implemented via slower networks.

SUMMARY OF THE INVENTION

In accordance with the present invention, there is now provided a data processing system comprising: a client system; a server system for connection to the client system; and a remote user terminal for connection to the server system; the client having means storing application code, means for executing, on receipt of a remote access request, the application code to generate output requests, and means for communicating the output requests to the server; the terminal having a display screen, and means for issuing the remote access request to the server; the output requests comprising display requests directed to manipulating the display screen and non-display requests which can be processed independently of the terminal; the server having means for forwarding the remote access request to the client, means storing decoding code, means for sending the decoding code to the terminal on detection of the remote access request, means for receiving the output requests from the client, means for generating responses to the non-display requests on behalf of the terminal, and means for returning the responses generated to the client and for forwarding the display requests to the terminal; and, the terminal further comprising means for receiving the decoding code and the display requests from the server, and means for executing the decoding code to manipulate the display screen in dependence on the display requests.

This advantageously provides a data processing system which can be implemented via a relatively slow network with improved efficiency. Specifically, in preferred embodiments of the present invention, an improvement in efficiency is brought about by sending only data directly related to inputs and graphics display output via the network. In particularly preferred embodiments of the present invention, an improvement in efficiency is brought about by reducing the volume of graphics data. In some embodiments of the present invention, such a reduction may be brought about by data compression of bit map images. In other embodiments of the present invention, such a reduction may be brought about by reducing field sizes to those required by the network client rather than setting field sizes to allow for the maximum possible as in conventional X systems. Examples of the present inventions also advantageously enable X applications to be run from any network computer.

In the preferred embodiment of the present invention, there is provided an image store for connection to the server and to the terminal, the image store having means for receiving from the server image data supplied to the server from the client in connection with a display request from the application code, means for storing the image data, means for assigning an image identifier to the stored image data, and means for sending the image identifier to the server, the server comprising means for forwarding the display request to the terminal with the image data replaced by the image identifier, the terminal comprising means for recovering the image data from the image store on receipt of the image identifier.

In some embodiments of the present invention, the client and the server may be implemented in the same computer system unit. However, in other embodiments of the present invention, the client and the server may be implemented by separate machines.

In some embodiments of the present invention the server and the terminal may be connectable via the internet for communication of one or more of the remote access request, the decoding code, and the display requests. In such embodiments, the server may further comprise a fire-wall function separating the client from the internet. Also, in such embodiments, the decoding code may comprise a Java applet.

Viewing the present invention from another aspect, there is provided a data processing method comprising: storing application code in a client system; executing, in the client, on receipt of a remote access request, the application code to generate output requests; communicating the output requests from the client to a server system, the output requests comprising display requests directed to manipulating a display screen of a remote user terminal and non-display requests which can be processed independently of the terminal; issuing the remote access request by the terminal to the server; forwarding the remote access request from the server to the client; storing decoding code in the server; sending the decoding code from the server to the terminal on detection, in the server, of the remote access request; receiving, by the server, the output requests from the client; generating, in the server, responses to the non-display requests on behalf of the terminal; returning the responses generated from the server to the client; forwarding the display requests from the server to the terminal; receiving, at the terminal, the decoding code and the display requests from the server; and, executing, in the terminal the decoding code to manipulate the display screen in dependence on the display requests.

Preferably, such a method comprises: receiving, in an image store, from the server image data supplied to the server from the client in connection with a display request from the application code; storing, in the image store, the image data; assigning, by the image store, an image identifier to the stored image data; sending the image identifier from the image store to the server; means for forwarding the display request from the server to the terminal with the image data replaced by the image identifier; and, recovering, by the terminal, the image data from image store on receipt of the image identifier.

Viewing the present invention from yet another aspect, there is provided a server system for connection to a client system and a remote user terminal having a display screen, the server comprising: means for forwarding to the client a remote access request from the terminal for access to application code resident on the client; means storing decoding code for execution by the terminal; means for sending the decoding code to the terminal on detection of the remote access request; means for receiving output requests from the application code on the client, the output requests comprising display requests directed to manipulating the display screen and non-display requests which can be processed independently of the terminal; means for generating responses to the non-display requests on behalf of the terminal; and, means for returning the responses generated to the client and for forwarding the display requests to the terminal.

BRIEF DESCRIPTION OF THE DRAWINGS

Preferred embodiments of the present invention will now be described, by way of example only, with reference to the following drawings, in which.

DETAILED DESCRIPTION OF THE PREFERRED EMBODIMENT

Figure 1:
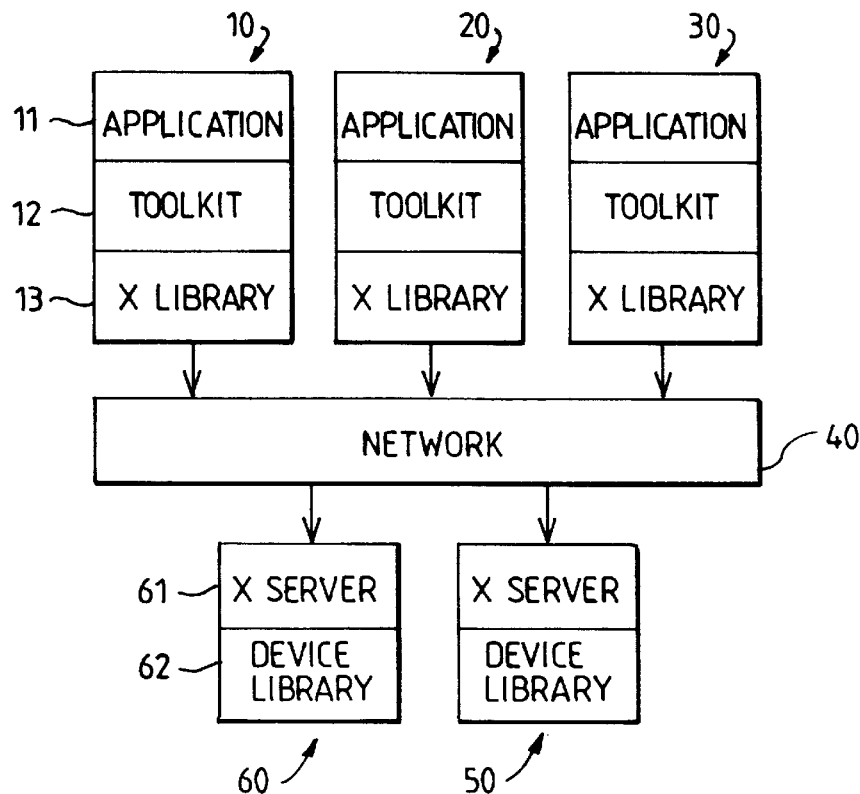
FIG. 1 is a block diagram of an example of a conventional X system.

Referring first to FIG. 1, an example of a conventional X system comprises a plurality of X client computers 10, 20 and 30 and a plurality of X server computers 60 and 50 all interconnected via a network 40. Each X client 10 comprises an application 11 and an X library 13 interconnected via a tool-kit 12. Each X server 60 comprises X server code 61 and a device library 62.

Figure 2:
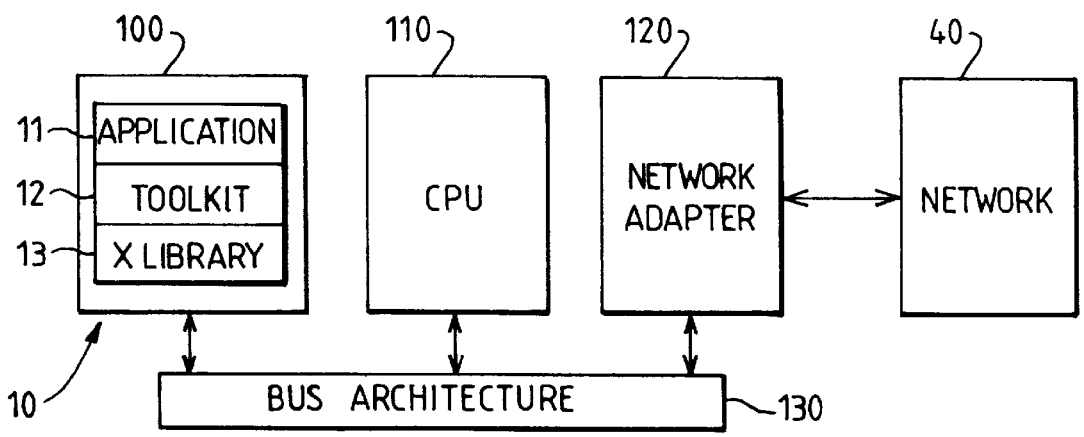
FIG. 2 is a block diagram of an example of a conventional X client.

Referring now to FIG. 2, in greater detail, each X client computer 10 comprises a system memory 100 storing the application 11, the tool-kit 12, and the X library 13. A central processor unit (CPU) 110 is connected to the system memory 100 via a bus architecture 130. Also connected to the bus architecture 130 is a network adapter 120. The network adapter 120 is also connected to the network 40.

Figure 3:
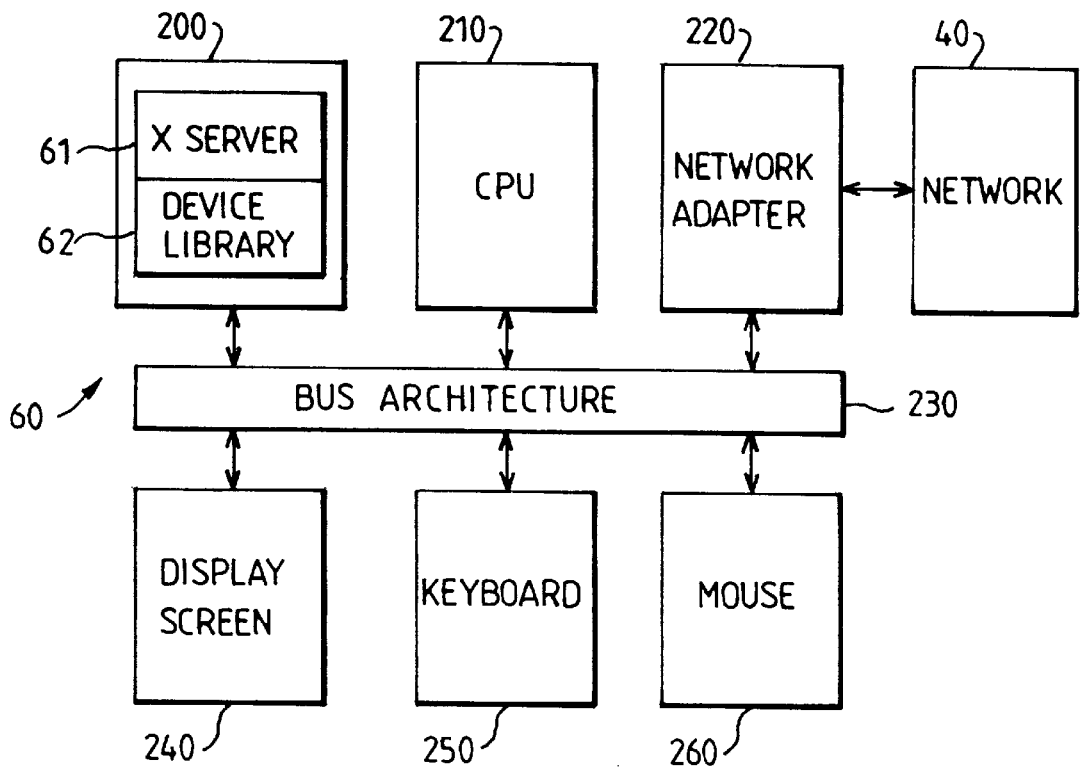
FIG. 3 is a block diagram of an example of a conventional X server.

With reference now to FIG. 3, each X server computer 60 comprises a system memory 200 storing the X server code 61 and the device library 62. A CPU 210 is connected to the system memory 200 by a bus architecture 230. Also connected to bus architecture 230 is a display screen 240, a keyboard 250, a pointing device such as a mouse 260, and a network adaptor 220. The network adaptor 220 is also connected to the network 40.

In the X client 10, the application 11 in the system memory 100 is executed by CPU 110. CPU 110 is configured by the tool-kit 12 and the X library 13 stored in the system memory 100 to convert display outputs from the executing application 11 to X protocol for communication via the network adaptor 120 and the network 40 to an X server 60 for display to a remote user of the application. In the X server 60, the display outputs, coded by the X client 10 according to the X protocol, are received from the network 40 by the network adaptor 220. The X server code 61 stored in system memory 200 configures the CPU 210 to decode the display outputs input to the network adaptor 220. The device library 92 stored in the system memory 200 configures the CPU 210 to convert the decoded display outputs into drive signals for driving the display screen 240 to produce an output image. The display screen 240 thus produces an output image which is based on the display outputs produced by the application 11 executing remotely on the X client 10.

The remote user at the X server 60 can interact with the application 11 executing at the X client 10 via the keyboard 250 and the mouse 260. Specifically, the CPU 210 is configured by the device library 62 to detect an input from the keyboard 250 or the mouse 260. The CPU 210 is configured by the X server code 61 to encode the detected input according to the X protocol and to supply the encoded input to the X client 10 via the network adaptor 220 and the network 40. At the X client 10, the encoded input is received from the network 40 by the network adaptor 120. The CPU 110 is configured by the X library 13 and the tool-kit 12 stored in the system memory 100 to decode the received input. The CPU 110 is configured by the application 11 to respond to the decoded input by, for example, producing a new display output for communication to the X server 60 as hereinbefore described.

In normal operation, there are usually a number of X requests issued to the X server 60 by the X client 10 which have no effect on the output image displayed on the display screen 240 of the X client 60.

Figure 4:
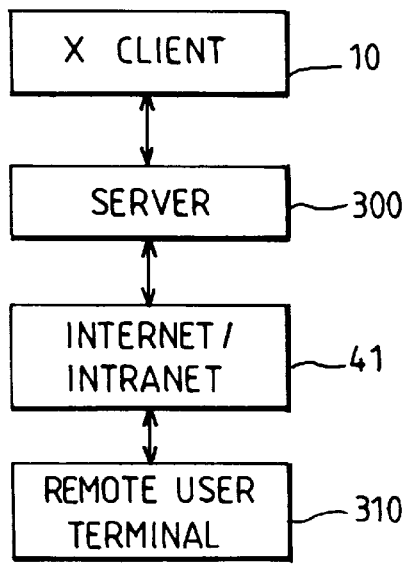
FIG. 4 is a block diagram of an X system embodying the present invention.

With reference now to FIG. 4, in a preferred example of an X system embodying the present invention, the X client computer 10 is connected to a server computer 300. The server 300 is connected to an remote user terminal 310 via the internet or an intranet hereinafter referred to collectively as net 41.

Figure 5:
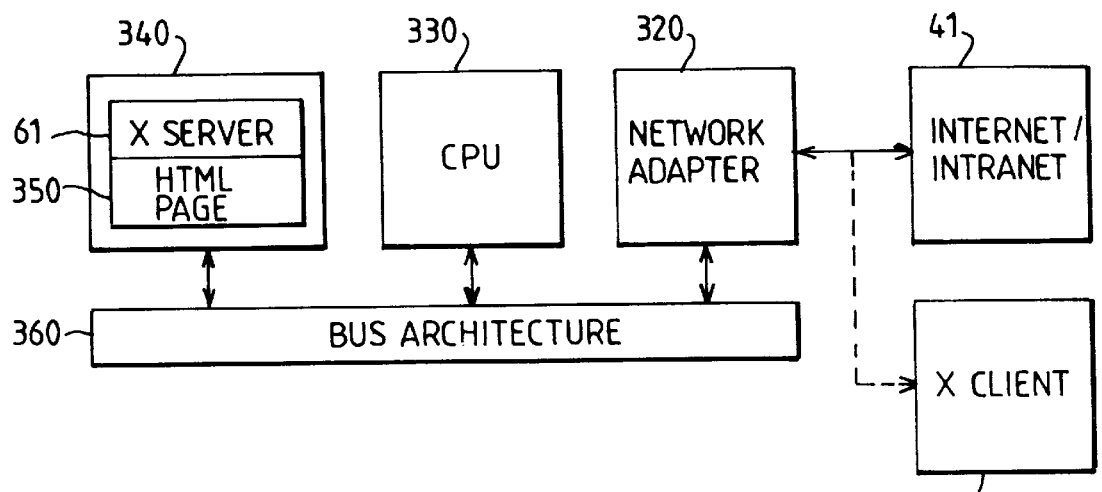
FIG. 5 is a block diagram of a server for the X system of FIG. 4.

With reference to FIG. 5, the server 300 comprises a system memory storing X server code 61, and an Hyper-Text Mark-Up Language (HTML) page corresponding to the application 11 provided by the X client 10. A CPU 330 is connected to the system memory 340 via a bus architecture 360. Also connected to the bus architecture 360 is a network adaptor 320. The network adaptor 320 is connected to the X client 10 and to the net 41.

Figure 6:
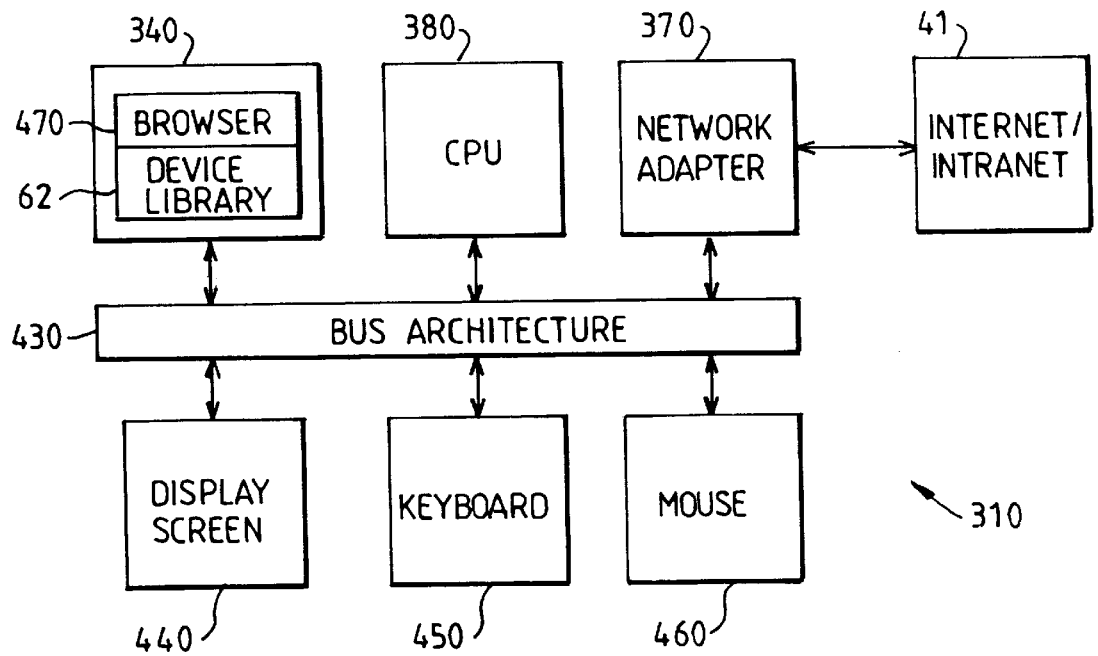
FIG. 6 is a block diagram of a remote user terminal for the X system of FIG. 4.

With reference now to FIG. 6, the remote user terminal 310 comprises a system memory 390 storing web browser code 470 and the device library 62. A CPU 380 is connected to the system memory 390 via a bus architecture 430. Also connected to the bus architecture 430 is a network adaptor 370, a display screen 440, a keyboard 450 and a pointing device such as a mouse 460. The network adaptor 370 is also connected to the net 41.

In operation, the server 300 serves the remote user terminal 310 via the net 41. Simultaneously however, the server 300 also appears to the X client 10 as if it is an X server. The server 300 handles X requests issued by X client. The server 300 handles many such X requests locally without needing to forward them to the remote user terminal 310. X requests which can be handled locally by the server 300 include those which do not require reference to the display screen 440 of the remote user terminal 300 such as InternAtom, Properties, and FontPaths. The parameters associated with such X requests are predetermined in accordance with, for example, the equipment supplied. Therefore, the responses to such X requests are always the same. In preferred embodiments of the present invention, there are further X requests which are handled locally by the server 300 including those relating to information which can be, and therefore are, tracked by the server 300 such as GetGeometry and QueryTree. Furthermore, in preferred embodiments of the present invention, further X requests are either ignored by the server 300 or responded to with minimal information because they are not relevant to the computing environment and, in general, do not originate in the application 11. Examples of such X requests include SetScreenSaver and GetScreenSaver.

In Table 1 below there is provide a list of examples of X requests which, in preferred embodiments of the present invention, are handled by the server 300 without reference to the remote user terminal 310. Against each example is the corresponding length of the request.

TABLE 1

| REQUEST | LENGTH/BYTES |
|---|---|
| ConnectionSetup | 60 + variable |
| GetWindowsAttributes | 52 |
| ConfigureWindow | 40 |
| QueryTree | 40 |

TABLE 1-continued

| REQUEST | LENGTH/BYTES |
|---|---|
| QueryKeymap | 44 |
| QueryFont | 36 + 8 per character |
| QueryTextExtents | 40 + variable |
| ListFontsWithInfo | 36 + 8 per character |
| InternAtom | 40 + variable |
| GetAtom | 40 + variable |
| ChangeProperty | 24 + variable |
| DeleteProperty | 12 |
| GetProperty | 56 + variable |
| ListProperties | 40 + variable |
| GrabServer | 4 |
| UnGrabServer | 4 |
| SetFontPath | 8 + variable |
| GetFontPath | 36 |
| ListInstalledColormaps | 4 + variable |

Figure 7:
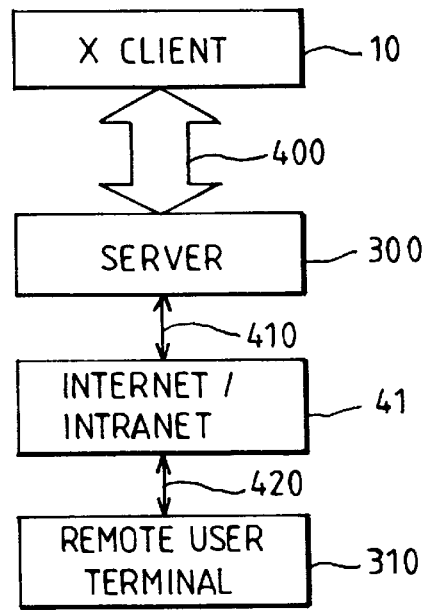
FIG. 7 is a block diagram of the X system illustrated in FIG. 4.

The server 300 only forwards to the remote user terminal 310 those X requests that directly affect the output image produced by the display screen 440. Referring now to FIG. 7, it will be appreciated that, in preferred embodiments of the present invention, the data traffic 410 and 420 flowing between the server 300 and the remote user terminal 310 is less than the data flowing between the server 300 and the X client 10. It will therefore be appreciated that the three tier X system architecture in accordance with the present invention, in which communications between an X client 10 and a remote user terminal 310 are conducted via an intermediate server 300, enables the remote user terminal 310 to connect to an application provided by the X client 10 via a relatively slow network without impairing system performance.

In particularly preferred embodiments of the present invention, the server 300 comprises a compressor for sending requests relating to significant changes in the output image to the remote user terminal 310 in compressed form.

Figure 8:
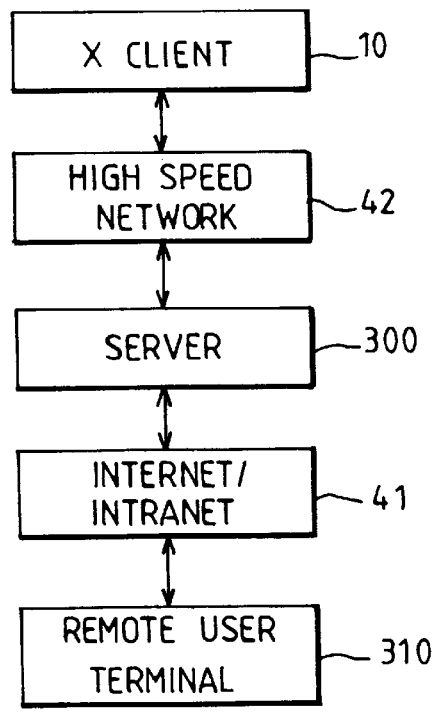
FIG. 8 is a block diagram of another X system embodying the present invention.

Communication between the server 300 and the X client 10 may be completed via a direct TCP/IP loop-back connection. However, referring now to FIG. 8, in other embodiments of the present invention, communication between the server 300 and the X client 10 may be completed via a high speed network 42 separated from the net 41 by a fire-wall function provided within server 300. Although in the preferred embodiments of the present invention described here in detail, the server 300 and the X client 10 are represented as being implemented by separate machines, it will be appreciated that, in other embodiments of the invention, the server 300 and the X client 10 may be integrated within the same machine.

Returning to FIGS. 4, 5, and 6, in operation, the connection between the server 300 and the remote user terminal 310 is completed via the net 41. The web browser code 470 stored in the remote user terminal 310 configures the CPU 380 to enable selective connection of the remote user terminal 310 to servers linked to the net 41, thus allowing HTML pages stored on such servers to be selectively downloaded from the net 41 to the remote user terminal 310. As will be described in further detail shortly, to access the application 11 executing on X client 10, a user of the remote user terminal 310 accesses, via the web browser 350, the corresponding HTML page 350 stored on server 300. The accessed HTML page is displayed on the display screen of the remote user terminal 440. The user operates the keyboard 450 or the mouse 460 of the remote user terminal 310 to select the desired application via the web page. The selection is communicated back to the server 300 via the link established between the server 300 and remote user terminal 310 via the HTML page 350 and the web browser 470. On receipt of the selection, the CPU 330 of the server 300, under the control of the X server code 61 stored in the system memory 340, sets up a communication path under the X protocol, with the application 11 provided by X client 10. In turn, the X client 10 executes the application 11 as hereinbefore described with reference to FIG. 1. However, in accordance with the present invention, any X requests issued by the X client 10 which do not affect the output from the display screen 440 of the remote user terminal 310 are responded to by the server 300 without being forwarded to the remote user terminal 310. The X server code 61 in the server 300 configures the CPU 330 to identify any X requests from the X client which affect the output from the display screen 440 of the remote user terminal 300. Any such X requests identified are then forwarded by the server 300 to the remote user terminal 300 via the net 41. The HTML page 350 initially down-loaded into the remote user terminal 310 from the server 300 comprises decoder code executable by the CPU 380 of the remote user terminal to decode and execute display-related X requests forwarded from the server 300. In particularly preferred embodiments of the present invention, the decoder code comprises an applet written in the Java computing language. The Java applet, when executed by the CPU 380, converts each display related X request into a display output. The device library 62 converts each display output into drive signals for driving the display screen 440. Inputs to the application 11 from the user are delivered back from the remote user terminal 310 to the server 300 via the net 41. The server 300 relays the inputs back to the X client 10 under the X protocol as hereinbefore described.

Under the X protocol, windows are not displayed except in specific circumstances. Those circumstances are:
 a) When the window is mapped and all parent windows are also mapped; and,
 b) When a window attribute is changed to exposed.

At start-up, a typical application creates undisplayed windows that may never or rarely be displayed during execution. In preferred embodiments of the present invention, the server 300 tracks the status of windows as the application is executed. Such tracking enables Map requests to be handled by the server 300. The server 300 then only forwards a request to the remote user terminal 310 when the request is an Expose request demanding exposure of a window. Even then, because the server 300 is tracking the status of windows, only the detail of which window is to be exposed need be forwarded to the remote user terminal 310. Window Notify events such as CreateNotify, DestroyNotify, MapNotify, UnMapNotify, and ConfigureNotify are handled by the server 300 without reference to the remote user terminal 310. Similarly, the server 300 handles Query requests relating to window attributes without reference to remote user terminal 310. Only changes to windows which affect size and positioning within a window stack are passed to the remote user terminal 310.

In preferred embodiments of the present invention, the remote user terminal 310 comprises backing storage for at least parent windows. The backing storage enables the remote user terminal 310 to move windows without reference to the X client 10. The backing storage further permits the remote user terminal 310 to present smoother graphics. Furthermore, the backing storage enables the remote user terminal 310 to perform faster screen refreshes.

Figure 9:
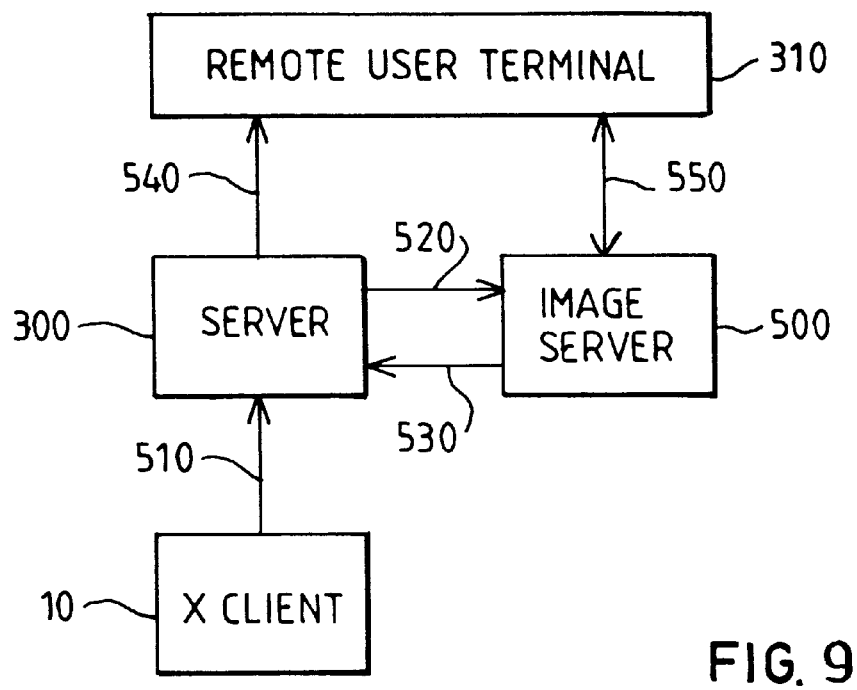
FIG. 9 is a block diagram of another X system embodying the present invention; and, FIG. 10 is a flow diagram of an X system embodying the present invention.

Referring now to FIG. 9, in particularly preferred embodiments of the present invention, there is provided an image server 500 having a cache for storing compressed images. The image server 500 is connected to the server 300 and the remote user terminal 310 via the net 41. In operation, the image server 500 reduces congestion between server 300 and the remote user terminal 310 by providing a separate path for supplying image data traffic to the remote user terminal 310 via the net 41. A specific example operation involving the image server 500 will now be described with reference to the data flows represented by the arrows in FIG. 9. At step 510, the X client 10, running the application 11, sends the server 300 a PutImage request together with the name of the application 11. At step 520, the server 300 copies the request to the image server 500 together with the name of the application 11. On receipt of the request, the image server 500 assigns an image identifier which is preferably in the form of a Universal Resource Locator to the request. At step 530, the image server 500 returns an image identifier assigned to the request to the server 300. At step 540, the server 300 forwards the PutImage request to the remote user terminal 310 with the image identifier supplied by the image server 500 in place of the actual image. The remote user terminal 310 retrieves the image identifier from the received request, thereby identifying the location on the net 41 of the image server 500 containing the image. At step 550, the remote user terminal 310 accesses via the net 41 containing the image server 500 the image to which the image identifier is assigned. Because the image server 500 is connected to the net 41, all users of the application 11 can access the same compressed image cache. Furthermore, the caching of compressed images simplifies execution of the application 11.

Figure 10:
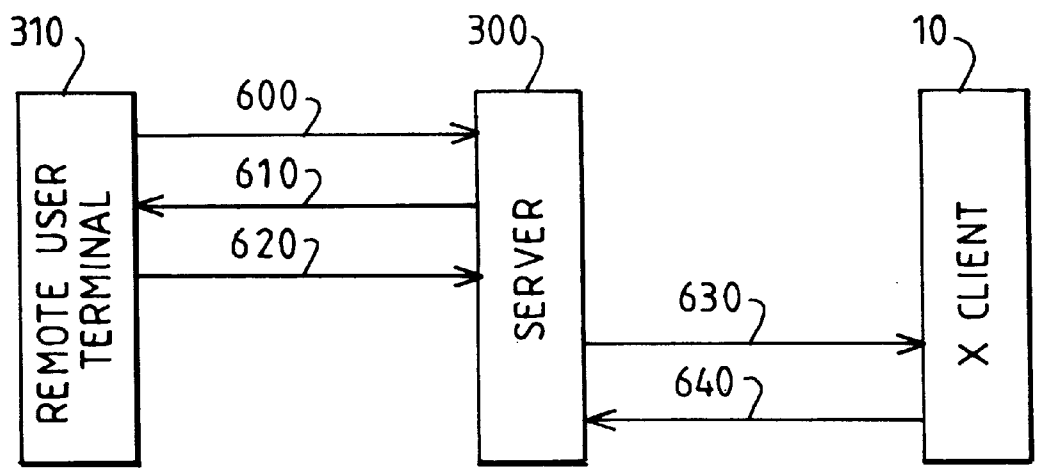

Referring now to FIG. 10, what follows is a detailed description of the process by which, in a preferred embodiment of the present invention, the remote user terminal 310 establishes communication with the X client 10. As mentioned earlier, at step 600, the user of remote user terminal 310 accesses, from server 300, via net 41, the HTML page 350 corresponding to the desired application. The HTML page 350 down-loaded to the remote user terminal 310 at step 610 includes an applet containing parameters specifying the name of the corresponding application 11 and the identity of a port of the server 300. At step 620, the remote user terminal 310 sends the name of the application on X client 10 to the identified port of the server 300. The server 300 reads the name of the application 11 and checks that the application 11 is configured to run. The check is performed for security purposes. The server 300 then finds a free X socket; sets the DISPLAY variable of the X protocol to correspond to the chosen socket; instructs the X client 10 to execute the application 11; and, listens on the X socket for requests from the X client 10.

Preferred embodiments of the present invention have been hereinbefore described with reference to the X software protocol. However, it will be appreciated that the present invention is equally applicable to other, similar software protocols.

Furthermore, in the preferred embodiments of the present invention hereinbefore described, the decoder code delivered to the remote user terminal 310 by the server 300 is written in the Java language. However, it will be appreciated that, in other embodiments of the present invention, the decoder code may be written in other suitable network computing languages.

A summary then of what has been hereinbefore described by way of example of the present invention is a data processing system comprising: a client system (10); a server system (300) for connection to the client system; and a remote user terminal (310) for connection to the server system; the client having means (100) storing application code (11), means (110) for executing, on receipt of a remote access request, the application code to generate output requests, and means (120) for communicating the output requests to the server; the terminal having a display screen (440), and means (370) for issuing the remote access request to the server; the output requests comprising display requests directed to manipulating the display screen and non-display requests which can be processed independently of the terminal; the server having means (320) for forwarding the remote access request to the client, means (340) storing decoding code, means (320) for sending the decoding code to the terminal on detection of the remote access request, means (320) for receiving the output requests from the client, means (330) for generating responses to the non-display requests on behalf of the terminal, and means (320) for returning the responses generated to the client and for forwarding the display requests to the terminal; and, the terminal further comprising means (370) for receiving the decoding code and the display requests from the server, and means (380) for executing the decoding code to manipulate the display screen in dependence on the display requests.

I claim:

1. A data processing system comprising: a client system; a server system for connection to the client system; and a remote user terminal for connection to the server system;

the client having means storing application code, means for executing, on receipt of a remote access request, the application code to generate output requests, and means for communicating the output requests to the server;

the terminal having a display screen, and means for issuing the remote access request to the server; the output requests comprising display requests directed to manipulating the display screen and non-display requests which can be processed independently of the terminal;

the server having means for forwarding the remote access request to the client, means storing decoding code, means for sending the decoding code to the terminal on detection of the remote access request, means for receiving the output requests from the client, means for generating responses to the non-display requests on behalf of the terminal, and for returning the responses generated to the client and for forwarding the display requests to the terminal; and the terminal further comprising means for receiving the decoding code and the display requests from the server, and means for executing the decoding code to manipulate the display screen in dependence on the display requests.

2. The system as claimed in claim 1, further comprising an image store for connection to the server and to the terminal, the image store having means for receiving from the server image data supplied to the server from the client in connection with a display request from the application code, means for storing the image data, means for assigning an image identifier to the stored image data, and means for sending the image identifier to the server, the server comprising means for forwarding the display request to the terminal with the image data replaced by the image identifier, the terminal comprising means for recovering the image data from image store on receipt of the image identifier.

3. The system as claimed in claim 1, wherein the client and the server are implemented in the same computer system unit.

4. The system as claimed in claim 1, wherein the server and the terminal are connectable via the internet for communication of one or more of the remote access request, the decoding code, and the display requests.

5. The system as claimed in claim 4, wherein the server comprises a fire-wall separating the client from the internet.

6. The system as claimed in claim 4, wherein the decoding code comprises a Java applet.

7. A data processing method comprising: storing application code in a client system; executing, in the client, on receipt of a remote access request, the application code to generate output requests;

communicating the output requests from the client to a server system, the output requests comprising display requests directed to manipulating a display screen of a remote user terminal and non-display requests which can be processed independently of the terminal; issuing the remote access request by the terminal to the server; forwarding the remote access request from the server to the client; storing decoding code in the server; sending the decoding code from the server to the terminal on detection, in the server, of the remote access request; receiving, by the server, the output requests from the client; generating, in the server, responses to the non-display requests on behalf of the terminal; returning the responses generated the decoding code from the server to the terminal on detection, in the server, of the remote access request; receiving, by the server, the output requests from the client; generating, in the server, responses to the non-display requests on behalf of the terminal; returning the responses generated from the server to the client; forwarding the display requests from the server to the terminal; receiving, at the terminal, the decoding code and the display requests from the server; and executing, in the terminal the decoding code to manipulate the display screen in dependence on the display requests.

8. The method as claimed in claim 7, further comprising: receiving, in an image store, from the server image data supplied to the server from the client in connection with a display request from the application code; storing, in the image store, the image data; assigning, by the image store, an image identifier to the stored image data; sending the image identifier from the image store to the server; means for forwarding the display request from the server to the terminal with the image data replaced by the image identifier; and recovering, by the terminal, the image data from image store on receipt of the image identifier.

9. A server system for connection to a client system and a remote user terminal having a display screen, the server comprising: means for forwarding to the client a remote access request from the terminal for access to application code resident on the client; means storing decoding code for execution by the terminal; means for sending the decoding code to the terminal on detection of the remote access request; means for receiving output requests from the application code on the client, the output requests comprising display requests directed to manipulating the display screen and non-display requests which can be processed independently of the terminal; means for generating responses to the non-display requests on behalf of the terminal; and means for returning the responses generated to the client and for forwarding the display requests to the terminal.

* * * * *